(12) United States Patent
Roll et al.

(10) Patent No.: US 6,350,379 B1
(45) Date of Patent: Feb. 26, 2002

(54) DUAL FILTER WITH FLOW MIXER

(75) Inventors: Mark Allen Roll, Bessemer City; Gregory Keith Rhyne, Denver; Willie Luther Stamey, Jr., Kings Mountain, all of NC (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/474,061

(22) Filed: Dec. 29, 1999

(51) Int. Cl.[7] ............................................... B01D 24/00
(52) U.S. Cl. .................... 210/323.2; 210/253; 210/254; 210/305; 210/307; 210/314; 210/316; 210/319; 210/320; 210/407; 210/437; 210/440; 210/DIG. 13; 210/DIG. 17
(58) Field of Search .................. 210/DIG. 13, DIG. 17, 210/323.1, 323.2, 433.1, 253–254, 304, 319, 512.1, 320, 335, 339, 434, 305, 307, 308–309, 332, 407, 314, 316, 440, 437

(56) References Cited

U.S. PATENT DOCUMENTS

| 3,397,786 A | 8/1968 | Hultgren |
| 3,586,171 A | 6/1971 | Offer |
| 3,637,078 A | 1/1972 | Hollar |
| 3,975,273 A | 8/1976 | Shaltz et al. |
| 4,655,914 A | * 4/1987 | Wada .......................... 210/168 |
| 4,802,979 A | 2/1989 | Medley, III |
| 4,885,082 A | * 12/1989 | Cantoni ........................ 210/90 |
| 4,997,556 A | * 3/1991 | Yano et al. .................. 210/136 |
| 5,447,627 A | * 9/1995 | Loafman et al. ............ 210/316 |
| 5,695,637 A | * 12/1997 | Jiang et al. ................. 210/316 |
| 5,785,850 A | 7/1998 | Lynch et al. |

* cited by examiner

*Primary Examiner*—Matthew O. Savage
*Assistant Examiner*—Marianne Ocampo
(74) *Attorney, Agent, or Firm*—Millen, White, Zelano & Branigan, P.C.

(57) ABSTRACT

A filter for filtering a fluid, such as lubricating oil for an engine, has a full flow filter element and a bypass filter element stacked on the full flow filter element. A flow-deflecting element is disposed between the full flow filter element and bypass filter element to provide a spinning motion to oil flowing from the bypass element as that oil joins oil which is passed through the full flow filter element. The spinning motion of the oil from the bypass filter element encourages mixing of the oil from the bypass filter element with the oil filtered by the full filter element. During operation of the engine this arrangement tends to provide cleaner lubricating oil and therefore reduces engine wear while increasing the time interval between scheduled maintenance.

18 Claims, 2 Drawing Sheets

DUAL FILTER WITH FLOW MIXER

FIELD OF THE INVENTION

The present invention relates to dual filters having a full flow element and a bypass element. More particularly, the present invention relates to a dual filter having a full flow element and a bypass element arranged in tandem.

BACKGROUND OF THE INVENTION

Filter cartridges used for filtering fluids such as lubricating oil can be arranged with a full flow filter element and a bypass filter element, the bypass filter element being stacked on the full flow filter element with the fluid flowing radially through the filter elements into hollow cores thereof and then axially out of the canister.

This arrangement is widely employed to filter lubricating oil used in internal combustion engines. Engine wear, specifically piston ring wear, is directly related to the amount of actual filtration of lubricating oil by both full flow and bypass filters which is mixed after filtration. It has been found that by combining filtration provided by a full flow filter element with that of a bypass filter element substantially reduces engine wear as compared to using only full flow filtration. Moreover, by using a combination of full flow and bypass flow lubricating oil, service intervals can be increased so that maintenance expense is reduced. Maintenance expense is a major consideration in the total expense of operating a vehicle. This is, of course, a major concern for fleets of vehicles, such as the fleets operated by trucking companies. In addition, by keeping lubricating oil clean, it can remain in engines longer and does not have to be recycled at shorter intervals. Consequently, environmental concerns due to vast amounts of used lubricating oil are reduced because less used oil must be recycled. It is therefore beneficial to enhance the performance of lubricating oil cartridges which utilize both full flow filter elements and bypass filter elements.

SUMMARY OF THE INVENTION

In view of the aforementioned considerations, it is a feature of the present invention to provide a filter for removing particles from a fluid wherein the filter comprises a canister having a first end with radially disposed inlet openings and a central outlet opening and having a second end which is closed. A first filter element having a first annular filter media defining a first substantially cylindrical hollow core is disposed adjacent the first end of the canister. A second filter element having a second annular filter media defining a second substantially cylindrical hollow core is stacked axially with respect to the first filter element. A flow mixing element connects the second hollow core to the first hollow core and includes a flow deflector which imparts a rotational component to the fluid as the fluid flows axially from the second hollow core to the first hollow core, whereby fluid flowing radially through the first filter media mixes with the rotating fluid which has been filtered by the second filter media before passing through the central outlet opening of the filter canister.

In another aspect of the invention, the flow mixing element comprises an annular channel formed about a core, the annular channel having a flow deflector therein which in a more specific aspect of the invention comprises at least one axially-extending angularly displaced rib.

In a further aspect of the invention, the afore-described rib extends across the annular channel and supports the core of the mixing element therein. In a more specific aspect, the core has at least one end which is closed to the passage of fluid so that the fluid flows from the second hollow core to the first hollow core only through the annular channel.

In a specific embodiment, the aforedescribed filter is used to filter lubricating oil for internal combustion engines.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts through the several views, and wherein.

DETAILED DESCRIPTION

Figure 1:
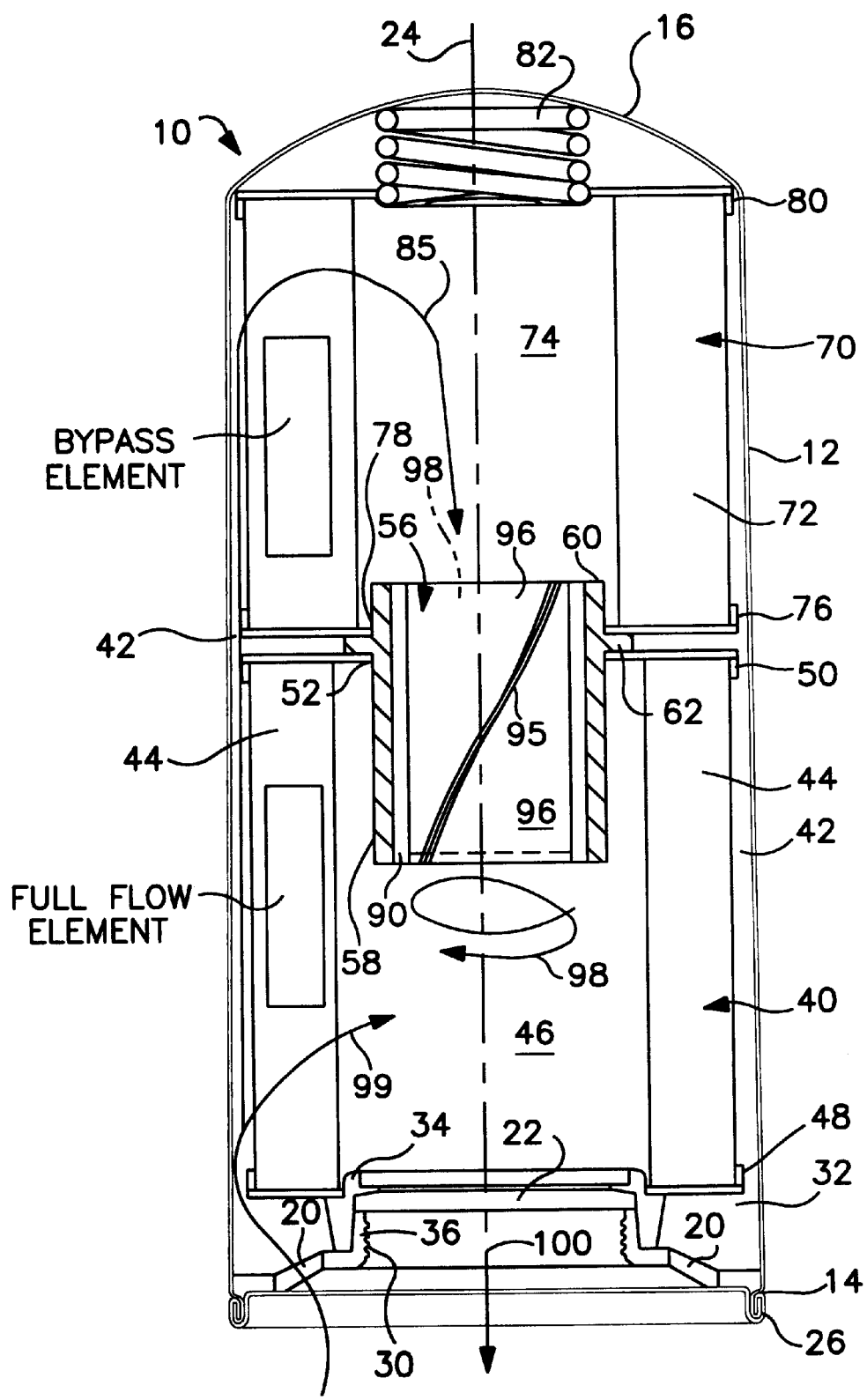
FIG. 1 is a side elevation, of a filter configured in accordance with the principles of the present invention.

Referring now to FIG. 1, there is shown a filter cartridge 10, configured in accordance with the principles of the present invention, wherein the filter cartridge 10 includes a canister 12 having a first end 14 and a second end 16. The first end 14 includes an end plate 18 which has a plurality of radially-spaced inlet openings 20 and a central axial opening 22 which is coaxial with an axis 24 of the filter canister. The end plate 18 is retained at the first end 14 and within the canister 12 by a crimped retaining arrangement 26.

The canister 12 is configured in accordance with a preferred embodiment of the invention as a filter canister for filtering lubricating oil used in internal combustion engines wherein the central outlet 22 has internal threads 30 which are threaded onto a hollow stud (not shown) projecting from an engine (not shown) to allow filtered oil to return to the engine. The plurality of radially spaced inlet openings 20 are isolated from the stud and allow lubricating oil to flow into an annular space 32 which is defined by a filter element support 34 that rests on the inner surface of the end plate 18 and surrounds a collar 36 which has the thread 30 on the inner surface thereof.

Resting on the filter element support is a first filter element 40 which is a full flow filter element. The first filter element 40 has a diameter less than the diameter of the housing 12 so that an annular inlet channel 42 is created between the filter element 40 and the inner surface of the wall of the canister 12. The first filter element 40 is comprised of a first annular filter media 44 having a first hollow core 46 therein and has first and second ends closed by first and second end caps 48 and 50. The first end cap 48 rests on the annular support 34, while the second end cap 50 is annular defining a hole 52 therethrough, which hole receives a flow-deflecting element 56. The flow deflecting element 56 has a first end 58 that projects into the first hollow core 46 and a second end 60 which projects above the first filter element 40. The flow deflecting element 56 has a radially projecting flange 62 which rests on the flange 50 so as to be sandwiched between the first filter element 40 and a second filter element 70.

The second filter element 70 has a second annular filter media 72 which defines therein a second hollow core 74, which second hollow core 74 communicates with the first hollow core 46 through the flow-altering element 56. The second filter element 70 has a first end closed by a first annular end cap 76 which has an opening 78 therethrough which receives the second end 60 of the flow-altering element 56 and abuts the top surface of the radial flange 62 so as to clamp the flow-altering element in place with the second end 60 of the flow-altering element received within the hollow core 74 of the first annular filter media 72. At the second end of the filter media 72 is a second end cap 80 which is a closed disk without a center opening. The second end cap 80 is engaged by a coil spring 82 which abuts the closed second end 16 of the canister 12 to urge the second filter element 70 against the radial flange 62 of the flow-deflecting element 56 that in turn abuts the first filter element 40 and holds the first filter element against the filter element support 34.

Dirty lubricating oil 85 flowing in the annular inlet channel 42 which does not flow radially through the first filter media 44 flows radially through the second filter media 72 and then through the flow-deflecting element 56.

Figure 2:
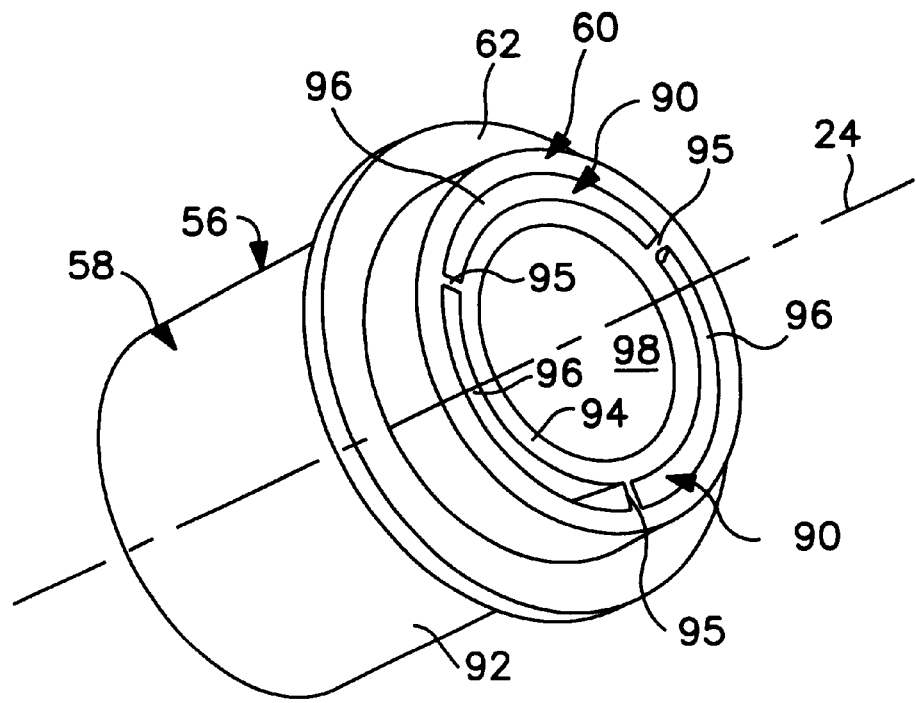
FIG. 2 is a perspective view of a flow-altering element utilized with the cartridge of FIG. 1.
Figure 3:
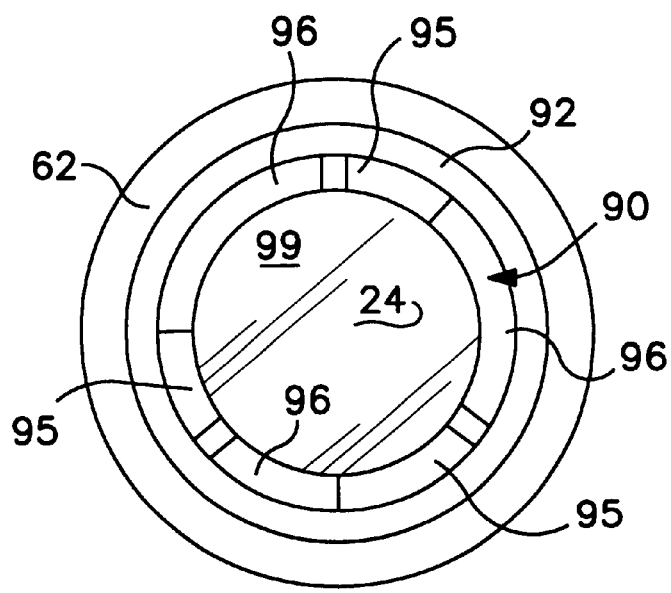
FIG. 3 is a bottom view of the flow control element of FIG. 2.

Referring now to FIGS. 2 and 3 in combination with FIG. 1, the flow-deflecting element 56 is configured as a cylindrical insert with an annular channel 90 disposed between an outer cylindrical sleeve 92 and an inner cylindrical sleeve 94. The outer sleeve 92 and the inner sleeve 94 are held in space with respect to one another by at least one rib 95. Preferably, there are three ribs 95 which extend between the inner circular sleeve 94 and outer circular sleeve 92 so that the annular channel 90 is divided into three circumferentially-spaced channels 96. As is seen in FIG. 1, the three ribs 95 extend axially in the direction of the axis 24 but are angularly spaced with respect to the axis as the ribs 95 progress from the second end 60 of the flow-deflecting element to the first end 58 thereof. Each of the channels 96 are deflected in the same direction. Consequently, as the fluid flows through the channels 96, it is given an angular component and therefore emerges from the end 58 of the flow-deflecting element so as to impart a spiraling motion to the fluid indicated by the arrow 98.

The spiralling fluid 98 mixes with fluid 99 which has passed radially through the first filter media 44 and then changes direction and flows axially out of the outlet 22. The resulting fluid stream 100 flowing out of the outlet 22 is therefore a mixture of this fluid 98 and the fluid 99.

The aforedescribed arrangement is especially useful with lubricating oil filters wherein the first filter element 40 is a full flow filter element and the second filter element 70 is a bypass filter element. It has been found desirable to mix the lubricating oil which has been filtered by the bypass filter element 70 with the filter oil filtered by the full flow filter element 40 before returning the oil to the engine in the flow stream 100 passing through the outlet 22. This arrangement is especially useful when the second filter element 70 which forms the bypass element is arranged for recycling sludge generated by the internal combustion engine while the full flow filter element 40 traps only particles or dirt. Consequently, as the oil stream undergoes many passes through the filter cartridge 10, the first filter element 40 traps primarily dirt or particulate matter in the filter media 44, while the second filter element 70 traps primarily sludge in the second filter media 72. Thus, the first filter media 44 has an increased dirt-holding capacity because it does not also trap sludge, thereby rendering the entire filtering system provided within the cartridge 10 with an increased capacity and efficiency that improves lubricating oil filtration and substantially increases the interval between oil filter changes.

The inner sleeve 94 provides a central closed core 105 which has adjacent the end 58 an end wall 107 so that the fluid flowing radially through the second filter media 72 of the second filter element 70 is forced to pass through the channels 96 of the annular channel 90. Most of the fluid tends to flow into the hollow core 105 which forms a cup that helps retain contaminants which have passed through the filter media 72 of the second filter element 70.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A filter cartridge for filtering a fluid comprising:
    a canister having a first end with radially-disposed inlet openings and a centrally-disposed outlet opening and having a closed second end;
    a first filter element having a first annular filter media defining a first substantially cylindrical hollow core communicating directly with the outlet opening, the first filter element being disposed adjacent the first end of the canister;
    a second filter element having a second annular filter media defining a second substantially cylindrical hollow core, the second filter element being stacked axially on the first filter element with the second hollow core communicating only with the first hollow core, and
    a flow deflecting element directly connecting the second hollow core to the first hollow core, the flow deflecting element comprising a flow deflector within an annular channel formed about a central closed core, which flow deflector imparts a rotational component to the fluid as the fluid flows from the second hollow core into the first hollow core, whereby fluid flowing radially through the first filter media mixes with the rotating fluid which has been filtered by the second filter media and has passed through the flow deflecting element before passing axially through the outlet opening of the filter cartridge.

2. The filter of claim 1, wherein the flow deflector comprises at least one axially extending angularly displaced rib disposed around the central closed core.

3. The filter of claim 2, wherein the rib extends across the annular channel and supports the central closed core therein.

4. The filter of claim 3, wherein the central closed core has at least one end closed to axial passage of fluid.

5. The filter of claim 4, wherein the central closed core is hollow and has a first closed end and a second open end, the open end being in the second hollow core defined by the second annular filter element.

6. The filter of claim 1, wherein the flow deflecting element comprises an annular channel formed about a central closed core, the annular channel having the flow deflector therein.

7. The filter of claim 6, wherein the flow deflector comprises at least one axially extending angularly displaced rib disposed around the central closed core.

8. The filter of claim 7, wherein the rib extends across the annular channel and supports the central closed core therein.

9. The filter of claim 8, wherein the central closed core has at least one end closed to axial passage of fluid.

10. The filter of claim 9, wherein the central closed core is hollow and has a first closed end and a second open end, the open end being in the second hollow core defined by the second annular filter element.

11. A filter cartridge for filtering a fluid comprising:
    a canister having a first end with radially-disposed inlet openings and a centrally-disposed outlet opening and having a closed second end;

a first filter element having a first annular filter media defining a first substantially cylindrical hollow core communicating directly with the outlet opening and selected for primarily removing particulates, the first filter element being disposed adjacent the first end of the canister;

a second filter element having a second annular filter media defining a second substantially cylindrical hollow core and selected for primarily removing sludge, the second filter element being stacked axially on the first filter element with the second hollow core communicating only with the first hollow core, and a flow deflecting element directly connecting the second hollow core to the first hollow core, the flow deflecting element comprising a flow deflector within an annular channel formed about a central closed core, which flow deflector imparts a rotational component to the fluid as the fluid flows from the second hollow core into the first hollow core, whereby fluid flowing radially through the first filter media mixes with the rotating fluid which has been filtered by the second filter media and has passed through the flow deflecting element before passing axially through the outlet opening of the filter cartridge.

12. The filter of claim 11, wherein the flow deflector comprises at least one axially extending angularly displaced rib.

13. The filter of claim 12, wherein the rib extends across the annular channel and supports the central closed core therein.

14. The filter of claim 13, wherein the central closed core has at least one end closed to axial passage of fluid.

15. The filter of claim 14, wherein the central closed core is hollow and has a first closed end and a second open end, the open end being in the second hollow core defined by the second annular filter element.

16. A filter cartridge for filtering a fluid comprising:

a canister having a first end with radially-disposed inlet openings and a centrally-disposed outlet opening and having a closed second end;

a first filter element having a first annular filter media defining a first substantially cylindrical hollow core communicating directly with the outlet opening, the first filter element being disposed adjacent the first end of the canister;

a second filter element having a second annular filter media defining a second substantially cylindrical hollow core, the second filter element being stacked axially on the first filter element with the second hollow core communicating only with the first hollow core, and a flow deflecting element directly connecting the second hollow core to the first hollow core, the flow deflecting element comprising a flow deflector comprising a radially projecting flange disposed between the first and second filter elements and a flow deflector which imparts a spiraling motion to the fluid as the fluid flows from the second hollow core into the first hollow core, whereby fluid flowing radially through the first filter media mixes with the spiraling fluid which has been filtered by the second filter media and has passed through the flow deflecting element before passing axially through the outlet opening of the filter cartridge.

17. A filter cartridge for filtering a fluid comprising:

a canister having a first end with radially-disposed inlet openings and a centrally-disposed outlet opening and having a closed second end;

a first filter element having a first annular filter media defining a first substantially cylindrical hollow core communicating directly with the outlet opening and selected for primarily removing particulates, the first filter element being disposed adjacent the first end of the canister;

a second filter element having a second annular filter media defining a second substantially cylindrical hollow core and selected for primarily removing sludge, the second filter element being stacked axially on the first filter element with the second hollow core communicating only with the first hollow core, and a flow deflecting element directly connecting the second hollow core to the first hollow core, the flow deflecting element comprising a flow deflector comprising a radially projecting flange disposed between the first and second filter elements and a flow deflector which imparts a spiraling motion to the fluid as the fluid flows from the second hollow core into the first hollow core, whereby fluid flowing radially through the first filter media mixes with the spiraling fluid which has been filtered by the second filter media and has passed through the flow deflecting element before passing axially through the outlet opening of the filter cartridge.

18. The filter of claim 17, wherein the flow deflecting element comprises an annular channel formed about a central closed core, the annular channel having the flow deflector therein.

* * * * *